June 10, 1958  J. C. MILLER  2,838,345
TRACTION DEVICE
Filed Aug. 17, 1954  2 Sheets-Sheet 2

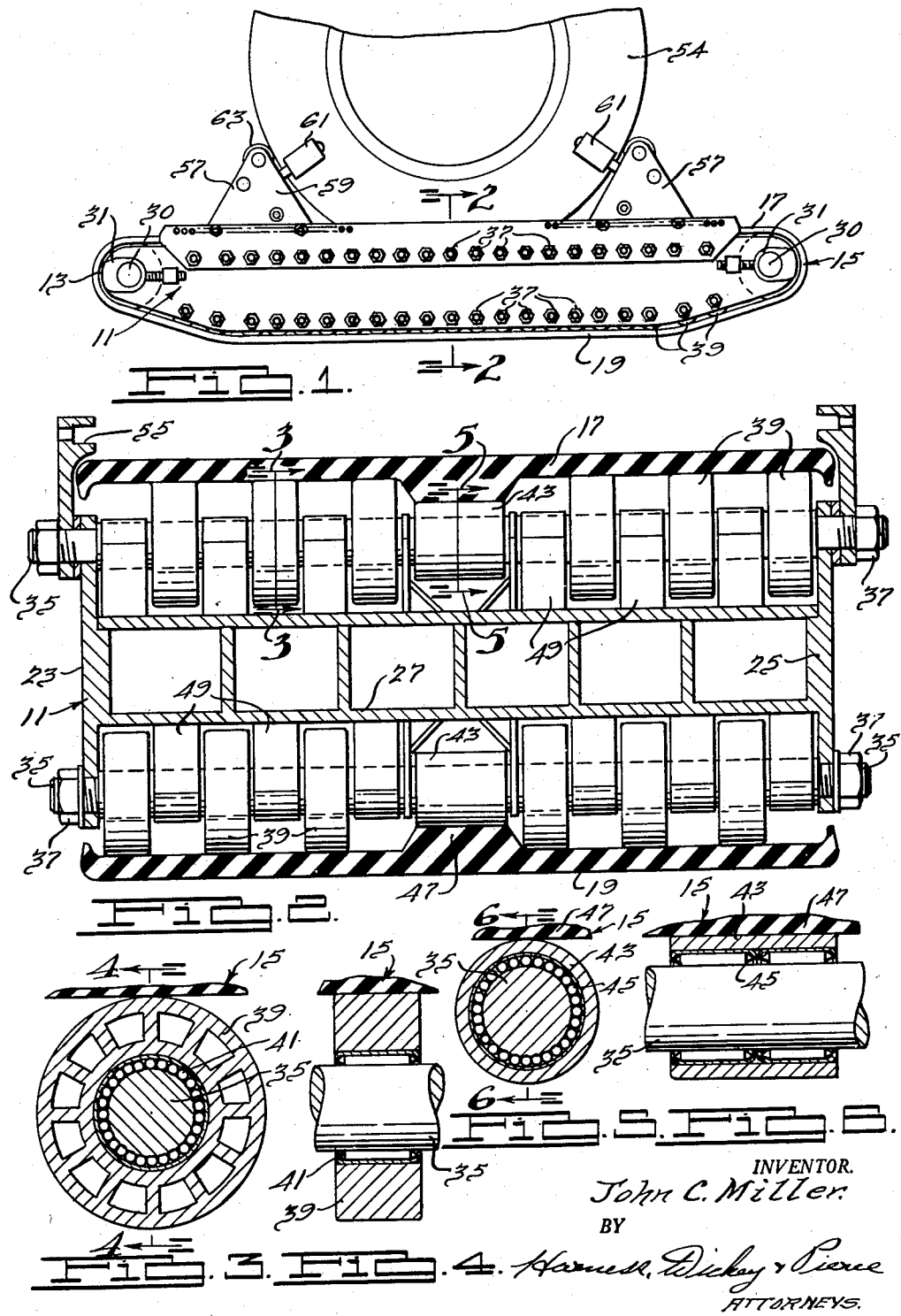
INVENTOR.
John C. Miller

INVENTOR.
John C. Miller.
BY
ATTORNEYS.

United States Patent Office 2,838,345
Patented June 10, 1958

2,838,345

TRACTION DEVICE

John C. Miller, Schenectady, N. Y.

Application August 17, 1954, Serial No. 450,312

5 Claims. (Cl. 305—10)

This invention relates generally to traction devices and more particularly to devices adapted for use in the flotation of wheeled vehicles in snow, mud, soft earth and the like, by greatly increasing the area of contact between the wheels and the ground, and constitutes an improvement over the invention disclosed in applicant's copending application for traction device, Serial No. 237,165, filed July 17, 1951, now Patent No. 2,782,076.

The use of traction or flotation devices has been found very desirable, and in some cases absolutely necessary, in order to permit the moving of wheeled vehicles such as trucks, busses, airplanes, automobiles and the like, over terrain under extremely bad conditions. That is, vehicles will often become completely bogged down in snow, mud, soft sand or dirt, ice, and the like. The device of this invention is adapted to spread the weight of the vehicle over a greater area than is possible merely through the vehicle tires, thus permitting the vehicle to be driven, pulled or moved in spite of such bad conditions. This device has been found to have particular advantage with respect to airplanes, which are extremely heavy and which tend to break through concrete runways or surfaces. Many of the air fields, particularly military air fields, are not adequately or properly surfaced to handle such heavy airplanes and a traction device is needed to prevent damage when the airplanes are stored, moved, towed, or the like.

It is therefore an object of this invention to provide a traction or flotation device of the aforementioned type which may be quickly connected with the wheels of a vehicle in a simple manner to provide the necessary flotation and traction to permit the vehicle to be driven, pulled or moved through extremely bad ground and surface conditions.

It is a further object of this invention to provide a traction device of the aforementioned type, which is relatively light in weight, durable in construction and easy to maintain.

It is a still further object of this invention to provide a device of the aforementioned type which will spread the load over as large an area as possible and which will not bind or become inoperative when carrying extremely high loads.

It is a still further object of this invention to provide in a device of the aforementioned type, simple and efficient means for releasably retaining a vehicle wheel on the device.

It is a still further object of this invention to provide a device adapted to be connected with various types of vehicles to provide traction or flotation therefor.

These and other objects of this invention will become apparent from the following detailed description, taken in conjunction with the accompanying drawings, in which:

Figure 1 is a side elevational view of the device of this invention supporting a vehicle wheel;

Fig. 2 is an enlarged sectional view of the structure illustrated in Fig. 1, taken along the line 2—2 thereof;

Fig. 3 is an enlarged sectional view of the structure illustrated in Fig. 2, taken along the line 3—3 thereof;

Fig. 4 is a sectional view of the structure illustrated in Fig. 3, taken along the line 4—4 thereof;

Fig. 5 is a sectional view of the structure illustrated in Fig. 2, taken along the line 5—5 thereof;

Fig. 6 is a sectional view of the structure illustrated in Fig. 5, taken along the line 6—6 thereof;

Figure 7:
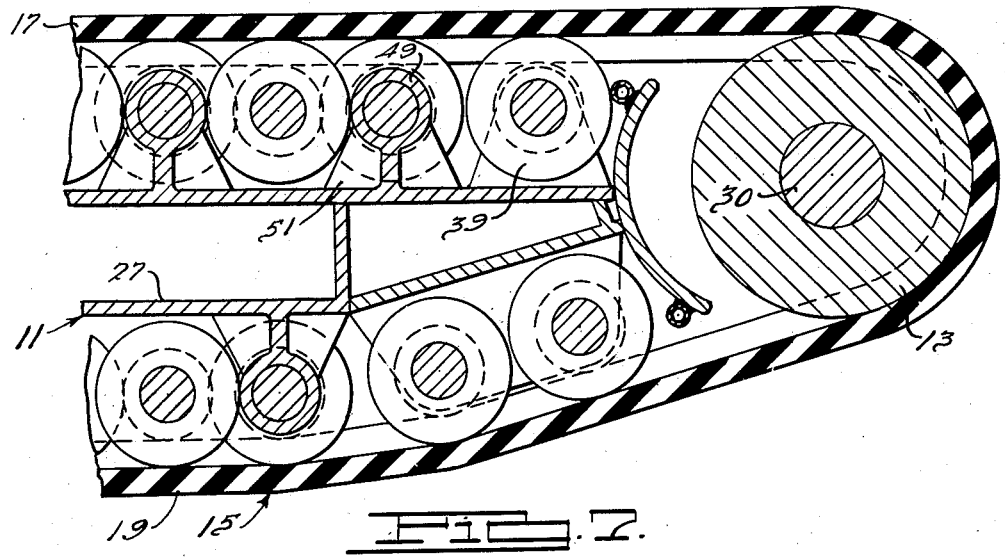
Fig. 7 is an enlarged fragmentary sectional view of one end of the device illustrated in Fig. 1, with parts broken away for purposes of clarity, and illustrating the manner in which the endless belt is supported on the device.

Referring now to the drawings, it will be seen that the traction device includes a supporting structure or frame 11, end support rollers 13, disposed adjacent opposite ends of the structure 11, and an endless belt 15 extending around the support rollers and being vertically spaced so as to have an upper reach 17 and a lower reach 19. The supporting structure or frame may be formed as a one-piece casting or may be formed of fabricated parts, but is illustrated as having laterally spaced, longitudinally extending, vertical plate portions 23 and 25 which are interconnected by a hollow crate or platform structure 27. The opposite ends of the vertical plate portions 23 and 25 are notched or recessed at 29 to receive the axle or shaft 30 on which the support rollers 13 are journalled. Each of the axles 30 has its opposite ends supported in a suitable take-up mechanism 31 connected with the supporting structure so that the support rollers can be adjusted fore and aft to maintain the proper tension on the belt 15 extending endlessly therearound. The supporting structure plate members 23 and 25 have laterally aligned longitudinally spaced apertures 33 therein both above and below platform portion 27. A shaft 35 extends between and through each opposed set of apertures 33 so that a plurality of transversely extending, longitudinally spaced shafts are disposed both above and below the platform portion 27. The shafts are suitably anchored to the vertical plate portions 23 and 25 by any suitable means and are illustrated as having their opposite ends threaded so as to receive nuts 37 for locking them against movement.

A plurality of rollers 39 are journaled on each shaft in laterally spaced apart relationship. The rollers are adapted to engage the back face of the endless belt to support the belt as it moves around the frame. As can be best seen in Figs. 3 and 4, the rollers 39 are journalled on the shafts 35 by suitable needle bearings 41. The center roller 43 on each shaft is of a smaller diameter than its adjacent rollers 39 and as can be best seen in Figs. 5 and 6, is journaled on the shaft by suitable needle bearings 45. The back face of the belt has an inwardly extending rib 47 which engages the periphery of the small rollers 43. The rib acts to maintain the belt in its properly centered relationship at all times. Shaft support means are disposed adjacent each roller to rigidly support the shaft on the frame or supporting structure 11 against deflection or bending. The shaft supporting means are illustrated as being in the form of pillow blocks 49 and as can be best seen in Figs. 2 and 7, a pillow block is disposed between each pair of rollers 39 and rigidly connected to the platform portion 27 of the supporting structure 11. The pillow blocks may be integral with the supporting structure, as illustrated, or separate elements rigidly connected to the supporting structure by any suitable means.

Figure 8:
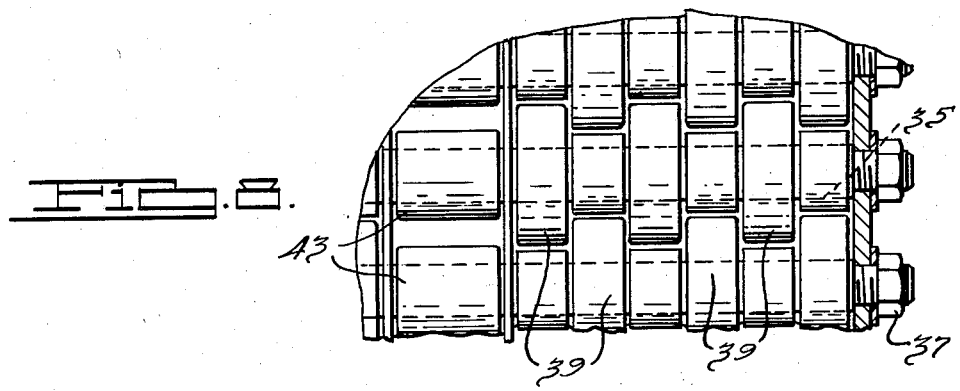
Fig. 8 is a fragmentary bottom elevational view showing the arrangement of the rollers which engage the belt.
Figure 9:
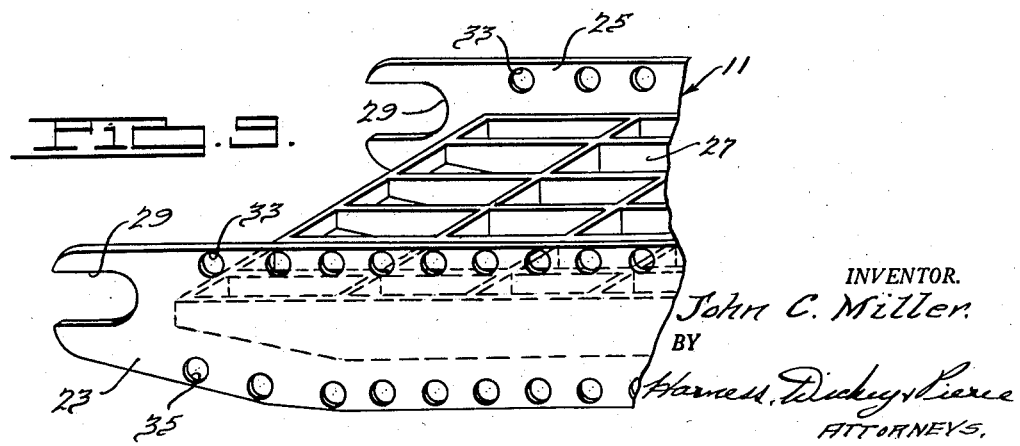
Fig. 9 is a fragmentary perspective view of a front portion of the supporting structure or frame of the device illustrated in Fig. 1.

It will be noted from Fig. 8 that the rollers on each adjacent shaft are laterally offset with respect to each other and longitudinally overlap each other so as to provide a nesting roller arrangement which will give maximum support, maximum area contact on the ground, and minimum shaft deflection because of the load distribution and the manner in which the axles or shafts are supported throughout their length adjacent each roller. That is, the rollers 39 on one shaft are disposed in longitudinal alignment with the pillow blocks 49 of the adjacent shafts. With such a construction it is possible to provide a total area of engagement of the rollers with an unyielding surface of almost twice that of a large aircraft tire, while at the same time maintaining the size and weight of the device to a minimum. It has been found, for example, that if the device has an over-all length of approximately forty-six and three-quarters inches (46¾") and an over-all width of fourteen (14) inches, with a total weight of two hundred and thirty (230) pounds, and has one hundred and thirty-six (136) rollers with a total roller contact area of seventy-eight and one-half (78½) square inches, the pressure at each contact point where a roller, and its adjacent belt portion, engages the surface will be one hundred and twenty-seven (127) pounds per square inch as compared with the pressure of the tire itself of two hundred and twenty-five (225) pounds per square inch, where the tire carries a load of ten thousand (10,000) pounds. On different types of surfaces which would yield under load, the total contact pressure area of the device would increase, which would mean a decrease in unit pressures down to a minimum of thirty-two (32) pounds per square inch over a total area of three hundred and twelve (312) square inches.

In order to properly support a wheel 54 of for example an aircraft, on the device, suitable ways 55 are provided on opposite sides of the vertical supporting structure plate portions 23 and 25. Slidably supported on the ways are a pair of longitudinally spaced guide and support devices 57. Each of these devices includes a pair of spaced apart plates 59 which are slidably supported in the ways 55 and which carry side guide rollers 61 and end guide rollers 63. The guide devices 57 may be adjusted fore and aft in the ways to properly engage and support a vehicle wheel on the upper reach of the belt so that the wheel cannot become accidently disengaged from a device. Suitable ramp means may be provided to drive the vehicle up onto the upper reach of the device. Thus, with the increased contact area the load of an airplane, truck, bus or automobile will be distributed over a considerably greater area so as to prevent the vehicle from becoming bogged down or from breaking through a prepared surface.

What is claimed is:

1. A traction device including a rigid frame, support rollers journalled on said frame adjacent the opposite ends thereof, an endless belt extending around said support rollers and having vertically spaced upper and lower reaches, a plurality of spaced shafts supported on said frame and extending transversely thereof above the lower belt reach, a plurality of spaced apart shafts supported on said frame and extending transversely thereof below the belt upper reach, a plurality of spaced-apart rollers journalled on each of said shafts and engaging the adjacent belt portion, bearing means journalling each roller on its shaft, shaft support means adjacent each roller rigidly supporting each of said shafts on said frame, the rollers on one shaft being offset from alignment with the rollers of an adjacent shaft and said rollers being disposed in an overlapping relationship with respect to each other so as to provide a nesting roller arrangement engaging the upper and lower reaches of the belt.

2. A traction device including a frame, support rollers journaled on said frame adjacent the opposite ends thereof, an endless belt extending around said support rollers and having spaced apart upper and lower reaches, a plurality of spaced-apart shafts supported on said frame and extending generally parallel to the axis of said support rollers, said shafts being disposed adjacent the upper reach of the belt and as well as adjacent the lower reach of the belt, a plurality of spaced-apart roller members journaled on each shaft and engaging the adjacent belt portion, shaft support means adjacent each roller and rigidly supporting the shaft on the frame adjacent the roller, said rollers being disposed in a nesting arrangement so that a wheel of a vehicle may be positioned on the upper belt reach while the lower belt reach engages a supporting surface, the number of rollers being such that the weight supported at the contact point of any one roller with an unyielding surface will be less than half of the weight in pounds per square inch exerted by the wheel on the upper reach of the device.

3. A traction device including supporting structure in the form of a pair of longitudinally extending vertical platelike members interconnected by a horizontal supporting structure which is disposed intermediate the upper and lower edges of said plate members, support rollers journaled in the opposite ends of said plate members, an endless belt extending around said support rollers so as to have an upper reach disposed above the horizontal supporting structure portion and a lower reach disposed below said supporting structure portion, a plurality of shafts extending between and connected with said supporting structure plate portions above said supporting structure horizontal portion and below the upper reach of the belt, a plurality of rollers extending between and connected with said supporting structure plate members below said supporting structure horizontal portion and above the lower belt reach, said shafts being spaced longitudinally relative to each other so as to provide a plurality of shafts above and below the central supporting structure portion spaced longitudinally of each other over the majority of the distance between the support rollers, a plurality of spaced apart rollers journaled on each shaft and engaging the adjacent belt portion, bearing means journaling each roller on its shaft, a pillow block member disposed between each adjacent pair of rollers and rigid with the shaft and the supporting structure horizontal portion, the rollers of one shaft being laterally offset with respect to the rollers of an adjacent shaft and longitudinally overlapping relative thereto so as to provide a nesting roller arrangement.

4. A traction device including supporting structure in the form of a pair of longitudinally extending vertical platelike members interconnected by a horizontal supporting structure which is disposed intermediate the upper and lower edges of said plate members, support rollers journaled in the opposite ends of said plate members, an endless belt extending around said support rollers so as to have an upper reach disposed above the horizontal supporting structure portion and a lower reach disposed below said supporting structure portion, a plurality of shafts extending between and connected with said supporting structure plate portions above said supporting structure horizontal portion and below the upper reach of the belt, a plurality of rollers extending between and connected with said supporting structure plate members below said supporting structure horizontal portion and above the lower belt reach, said shafts being spaced longitudinally relative to each other so as to provide a plurality of shafts above and below the central supporting structure portion spaced longitudinally of each other over the majority of the distance between the support rollers, a plurality of spaced apart rollers journaled on each shaft and engaging the adjacent belt portion, bearing means journaling each roller on its shaft, a pillow block member disposed between each adjacent pair of rollers and rigid with the shaft and the supporting structure horizontal portion, the rollers of one shaft being laterally offset with respect to the rollers of an adjacent shaft and longitudinally overlapping relative thereto so as to provide a nesting roller arrangement, the center roller on each shaft being of a lesser diameter than the remaining rollers on the shaft, said belt having an inwardly extending central flange or projection engaging the periphery of the reduced diameter central rollers so as to aid in maintaining the belt in its proper centered relationship on the device.

5. A traction device including a supporting structure having vertical side walls and a horizontal platform interconnected with said side walls, support rollers journaled on said frame adjacent the opposite ends thereof, an endless belt extending around said support rollers so as to have spaced-apart vertically spaced upper and lower reaches, a plurality of spaced apart shafts extending between said vertical supporting structure members both above and below the platform portion thereof, said shafts being spaced apart throughout the majority of the extent between said support rollers, a plurality of spaced-apart rollers journaled on each shaft and engaging the adjacent belt portion, shaft support means adjacent each roller and rigidly supporting the shaft on the supporting structure, the rollers of the adjacent shafts being disposed in a nesting relationship relative to each other, means on said supporting structure providing ways adjacent the upper belt reach, guide means supported on said ways for fore-and-aft movement thereof and adapted to engage the wheel of a vehicle and retain the same both against longitudinal movement and lateral movement.

References Cited in the file of this patent

UNITED STATES PATENTS

| | | |
|---|---|---|
| 263,566 | Nixon | Aug. 29, 1882 |
| 2,556,270 | Groeller | June 12, 1951 |
| 2,618,516 | Smith | Nov. 18, 1952 |

FOREIGN PATENTS

| | | |
|---|---|---|
| 331,467 | Germany | Jan. 7, 1921 |